Sept. 6, 1966   R. H. FRAPPIER ETAL   3,270,630
MATERIAL HANDLING APPARATUS
Filed Aug. 21, 1963   4 Sheets-Sheet 1
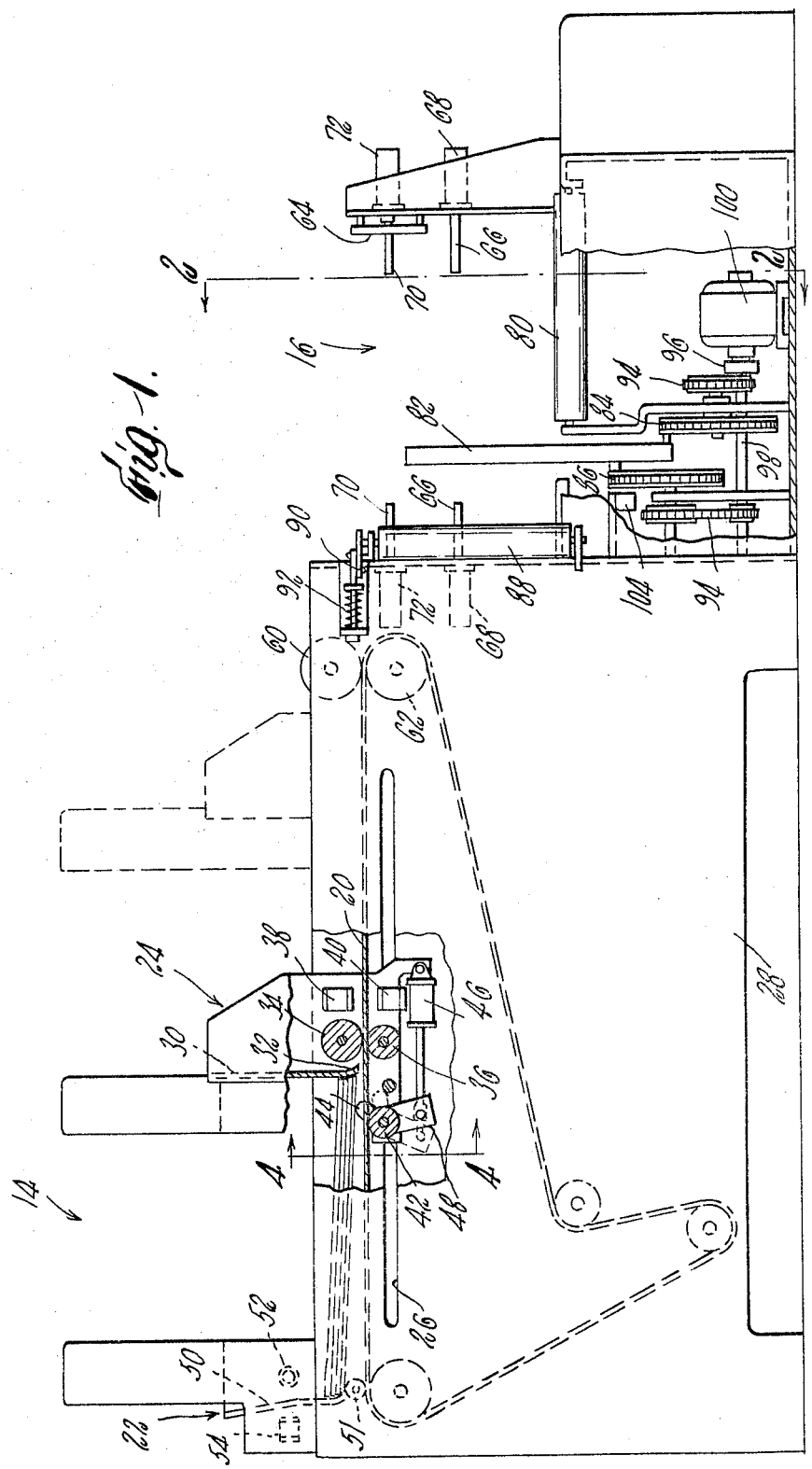

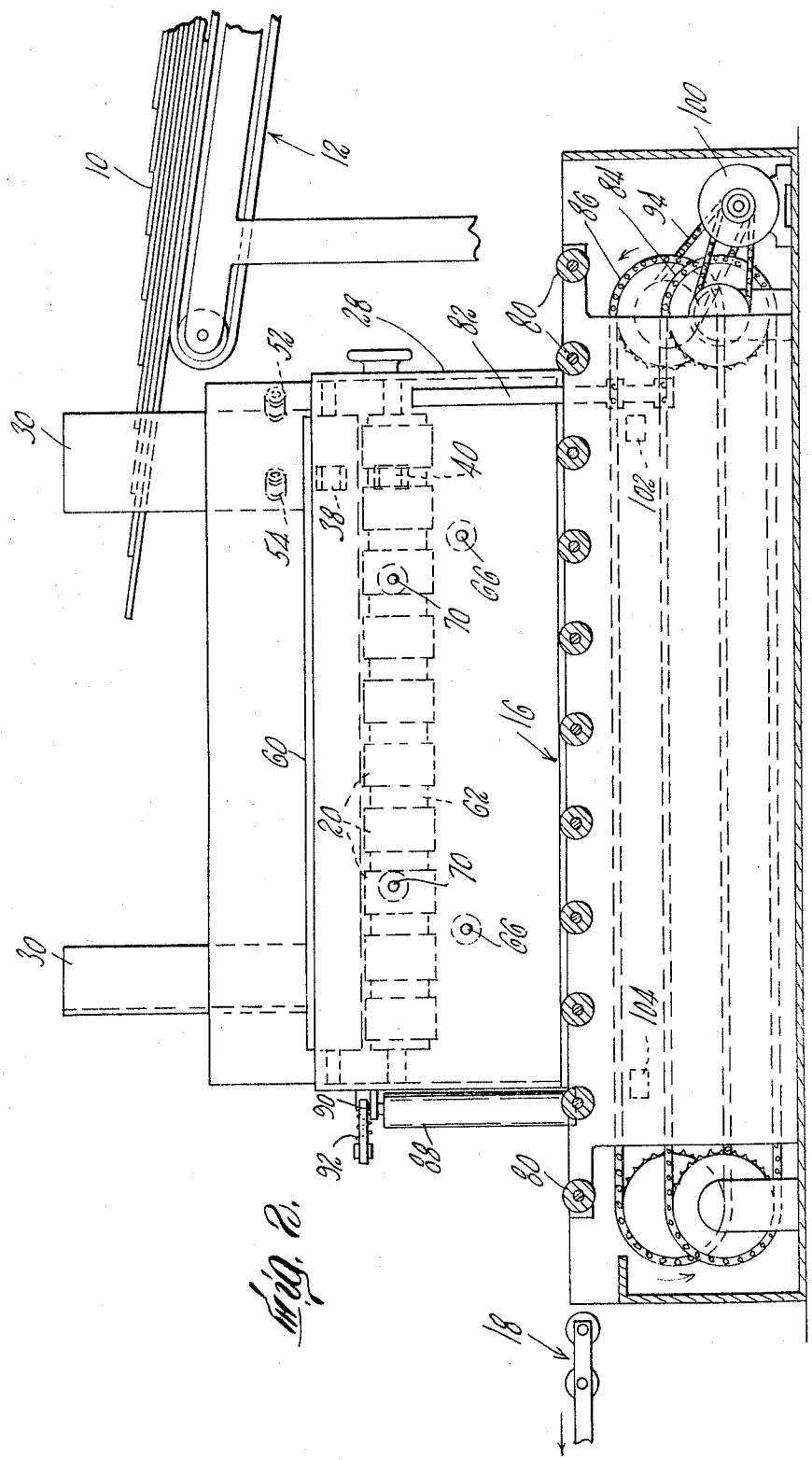

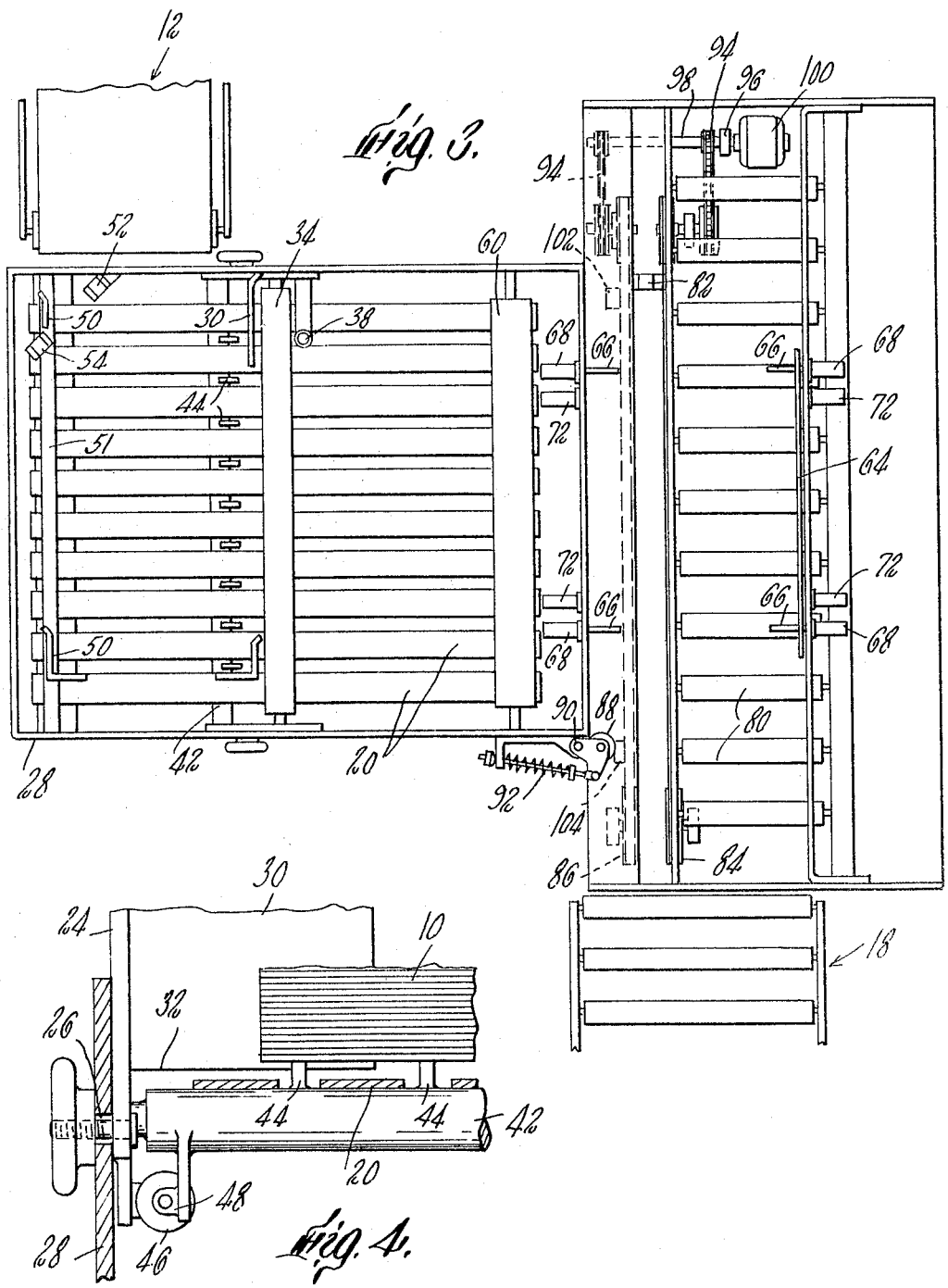

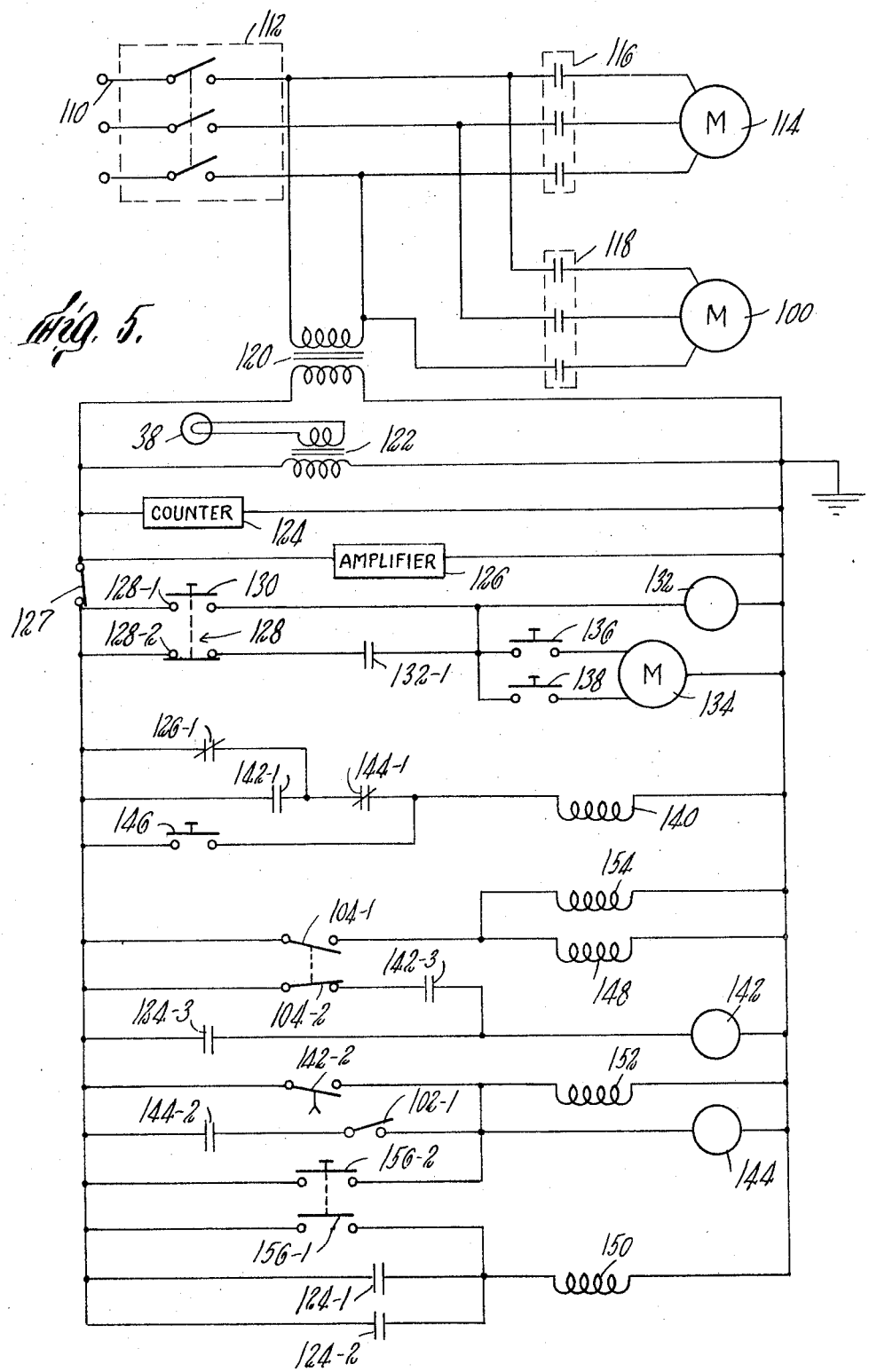

United States Patent Office 3,270,630
Patented Sept. 6, 1966

3,270,630
MATERIAL HANDLING APPARATUS
Robert H. Frappier, East Greenwich, and John F. O'Rourke, Jr., Cranston, R.I., assignors to Bostitch, Incorporated, East Greenwich, R.I., a corporation of Rhode Island
Filed Aug. 21, 1963, Ser. No. 303,558
1 Claim. (Cl. 93—93)

This invention relates to material handling apparatus and more specially to apparatus particularly adapted for counting and transferring sheet-like articles. An important field of utility for the invention lies in the provision of transfer apparatus for carton blanks in carton blank treating machines in general, and more particularly in folder gluer machines wherein knockdown carton structures are made from cut and scored paperboard blanks.

A principal object of the invention is to provide novel and improved material handling apparatus for assembling an accurate number of articles in a group, which articles may be received in a variety of manners from preceding article processing apparatus.

Another object of the invention is to provide novel and improved article transfer mechanisms which enable the efficient transfer of assembled groups of articles Still another object of the invention is to provide novel and improved apparatus for assembling carton blanks in a stack in a versatile and efficient manner.

A further object of the invention is to provide novel and improved control mechanisms for counting and transferring carton blanks in aligned relation for efficient stacking assembly operations.

Still another object of the invention is to provide novel and improved stack transfer mechanisms particularly adapted for use in counter-ejector apparatus employed in the processing of carton blanks.

Other objects, features and advantages of the invention will be seen as the following description of a preferred embodiment thereof progresses, in conjunction with the drawings, in which:

FIG. 1 is a diagrammatic side view of counter-ejector apparatus constructed in accordance with the invention;

FIG. 2 is a diagrammatic sectional end view of the counter-ejector apparatus taken along the line 2—2 of FIG. 1;

FIG. 3 is a diagrammatic top view of the counter-ejector apparatus shown in FIG. 1;

FIG. 4 is a view of a portion of the counter-ejector apparatus taken along the line 4—4 of FIG. 1 showing details of the carton blank feed control mechanism; and FIG. 5 is a schematic diagram of the control circuitry of the counter-ejector apparatus shown in FIGS. 1-3.

The apparatus shown in FIGS. 1-3 is utilized in box forming machinery systems and receives formed blanks from a folder gluer apparatus. The blanks 10 are flat pieces of double thickness and may be fed from a conveyor 12 on which they are disposed in shingled relation into a temporary storage unit in the form of a hopper 14 as shown in FIG. 1. The carton blanks are then fed from storage unit 14 in a counting operation into a stacking unit 16 for assembly into accurately counted stacks of blanks. When a stack of predetermined number is assembled, the stack is transferred to an output conveyor 18. Feed mechanisms other than the conveyor 12 may be employed with the apparatus.

The temporary storage unit 14 has a set of belts 20, continuously driven by conventional means not shown, in the base thereof which provide a support and feed to transfer blanks 10 serially from the hopper. The unit also includes a fixed side wall structure 22 and an adjustable side wall structure 24 which is movable toward and away from side wall 22 as guided by slots 26 in the frame 28 to vary the spacing therebetween for the accommodation of different sizes of blanks.

Carried by the adjustable side wall structure is a set of vertically disposed plates 30, each of which has an angularly offset lower end portion 32 spaced from the belts 20 as indicated in FIG. 1 to define an exit aperture through which the carton blanks are serially fed. Mounted forwardly of the plate 30 are a pair of feed rolls 34, 36 which insure positive transfer of the carton blank from the hopper 14. Immediately forward of the feed roll is a carton sensor which includes light source 38 and photocell 40 disposed in vertical alignment. A feed control mechanism is also mounted on the adjustable guide structure in the form of rotatable shaft 42 on which is mounted a plurality of fingers 44 disposed between the belts 20. A biased pneumatic actuator 46 is coupled to shaft 42 by means of linkage 48 and rotates the shaft through an angle of approximately 30° to move the fingers 44 between a raised position as shown in FIG. 1 and a lowered position (shown in dotted lines in FIG. 1) in which the fingers are beneath the upper run of belts 20.

The fixed side wall structure 22 includes a set of vertically disposed plates 50 complementary to plates 30. At the bottom of plates 50 is a driven knurled roll 51 on which the rear end of the lowest carton blank 10 is hopper 14 rests. Also carried by the fixed wall structure is a height sensor which includes light source 52 and photocell unit 54 disposed across a corner of the hopper in a horizontal plane as best indicated in FIG. 3.

At the forward end of frame 28 a second pair of feed rolls 60, 62, are mounted. These feed rolls provide positive transfer of the blank on the belts 20 to the stacking hopper 16. That hopper includes an adjustable guide structure which carries a vertical surface 64 of resilient material against which the blanks are fed by the feed rolls 60 and 62. Disposed within the hopper 16 are two sets of auxiliary support members, a set of midcount fingers 66 that are operated by double acting pneumatic cylinders 68 between an extended position as shown in FIG. 1 and a retracted position where they do not protrude into the hopper 16; and a set of upper fingers 70 which are disposed above fingers 66 but below the feed level from rolls 60, 62, and are moved between an extended position and a retracted position in a manner similar to midcount fingers 66 by double acting pneumatic cylinders 72. In the bottom of the stacking hopper there is a conveyer mechanism including a plurality of horizontally disposed rollers 80 and a vertical ejector pusher element 82 which is mounted on two chain drives 84, 86 which, when operated, move the pusher element 82 through the stacking hopper to transfer a stack of blanks from the hopper to an output conveyer 18. A vertically disposed roller 88 mounted for oscillatory movement about the pivot 90 as shown in FIG. 3 is resiliently biased by spring 92 and performs an aligning function as the stack of blanks are moved out of the hopper.

The pusher element 82 extends to a height slightly below the upper set of auxiliary support fingers 70 and is supported on the pair of chain drives 84, 86 as shown in FIGS. 1-3 so that it remains in vertical position throughout their drive cycle. These chain drives are coupled by chain drives 94 and clutch 96 to the output shaft 98 of a reversible drive motor 100. When the motor is energized, the chains are driven in synchronism to move the pusher 82 through the stacking hopper 16 pushing the stack of carton blanks on rollers 80 in front of it out of the hopper and onto conveyor 18. At the end of the upper run of the chains the pusher 82 remains in vertical position but moves to a lower level for return to the starting position below the level of the midcount fingers 66 so that it does not interfere with either those fingers in their extended position or any material that may be supported on those fingers at that time.

Two limit switches are contacted by the pusher structure in its cycle of movement, a first limit switch 102 at one end of the hopper and a second limit switch 104 at the other end of the hopper. This open ended stacking hopper enables ejection of accurately counted and stacked blanks in either direction, merely by reversing the control functions of the limit switches 102, 104 and reversing the drive direction of motor 100. The wall 66 is adjustable toward and away from the fixed wall of the hopper 34 to correspond to the adjustment of guide structure 24 so that the apparatus accommodates a variety of sizes of box blanks.

A circuit diagram of the control circuitry for this apparatus is shown in FIG. 5. 220 volt three phase power is supplied over lines 110 through a main control switch 112 to a main drive motor 114 and an ejector drive motor 100. The main drive motor 114 powers the storage hopper drives and is controlled by contactor 116 and the ejector drive motor which drives pusher 82 is controlled by contactor 118. Single phase power is applied through step down transformer 120 to supply 110 volt power to the control circuitry. A second transformer 122 steps the voltage down further to supply power for operating the light sources.

That control circuitry includes a counter 124 which is responsive to the photocell 40 and is stepped in response to each blank sensed by that sensor; and a low limit amplifier 126 which is responsive to the photocell 54 and amplifies the output signal to provide an indication when the stack of blanks 10 reaches a predetermined level in hopper 14. Switch 127 controls the application of power to all the control relays.

A motor control switch 128 has two sets of contacts 128–1 and 128–2. This switch is a two-way switch which in the position shown is operative to establish a holding circuit for continuous operation of the apparatus (contacts 128–2 not being opened); and in a second position holds contacts 128–2 open so that jogging operation is permitted in response to the start push button 130 which closes the contacts 128–1 momentarily. Connected in series with switch 128 is a relay coil 132 which operates contacts 132–1 connected in series with contacts 128–2 and in parallel with contacts 128–1 to provide a holding circuit. Relay 132 also controls the contactor 116 to start the main drive motor 114. Also controlled by the relay 132 is a speed control motor 134 which varies the effective output speed of motor 114 by adjusting the pitch diameter of drive sheaves for example. Push button 136 supplies power to motor 134 to increase the drive speed and push button 138 supplies power to motor 134 to decrease the drive speed.

The circuit which controls the position of the storage hopper feed control fingers 44 includes relay solenoid coil 140, which controls the application of air pressure to cylinders 46. The fingers are in their up (no feed) position when solenoid coil 140 is energized. Connected in series with solenoid 140 are normally closed contacts 126–1 which are opened after a short time delay in response to an output from amplifier 126. (Contacts 126–1 are closed whenever the level of blanks in hopper 14 fall so that the path between source 52 and sensor 54 is unobstructed.) A set of normally open contacts 142–1 are operated by coil 142 and when they are closed they complete a parallel circuit for energizing the solenoid 140. Normally closed contacts 144–1 are connected between coil 140 and this parallel circuit. In addition, there is provided a push button 146 for controlling the position of the storage hopper fingers 44 manually.

The solenoids 148, 150 control the position of the midcount fingers 66 and solenoids 152, 154 control the position of the upper fingers 70. Each solenoid, when energized, opens a valve to apply pressure to the connected cylinders, the energization of solenoid 148 or 152 causing the corresponding fingers to move out into their supporting position and the energization of solenoid 150 or 154 causing the corresponding fingers to retract. Solenoids 148 and 154 are controlled by limit switch contacts 104–1 which close momentarily when the ejector pusher 82 moves to the output end of the stacking hopper 16, and, when so operated, retract the upper fingers 70 and extend the midcount fingers 66. A push button may also be provided to enable manual extension of the midcount fingers, as for example at the start of operation of the machine, if desired. Solenoid 150 is primarily controlled by contacts 124–1 which are responsive to a preset midcount output of the counter 124 and which when closed energize the solenoid 150 to retract the midcount fingers. A second set of counter controlled contacts 124–2 actuate solenoid 150 in response to a preset final count (insuring the retraction of fingers 66 before operation of pusher 82), and the midcount fingers may be manually extended via push button contacts 156–1. Solenoid 152 is energized when the delay contacts 142–2 close or when push button contacts 156–2 close. This operation also energizes relay solenoid 144 to complete a holding circuit via contacts 144–2 which is maintained until limit switch contacts 102–1 are opened when the pusher 82 returns to its starting point.

Relay coil 142 is initially energized by closing of counter contacts 124–3 when a preset final count has been reached. The energization of relay coil 142 closes contacts 142–1 to interrupt the feed from the storage hopper 14 to the stacking hopper 16 and closes contacts 142–3 to complete a holding circuit with limit switch contacts 104–2 across the contacts 142–3; and operates contactor 118 to start the ejector drive motor 100.

In the operation of this apparatus, blanks 10 are fed from the folder gluer (or other apparatus) into the storage hopper 14 by suitable means such as conveyer 12. Initially the support fingers 44 are in raised position and hold the stack of blanks, as it is accumulated in the hopper 14, up out of contact with the drive belts 20. When the stack of blanks has accumulated sufficiently to block light to photocell 54, the amplifier 126, after a short time delay to permit accumulation of a few additional blanks in the hopper, opens contacts 126–1 to deenergize solenoid 140 so that the biased pneumatic cylinder 46 rotates shaft 42 to lower fingers 44 and permit the stack to drop into engagement with the drive belts 20, and positions the lowest blank so that it can be fed through the gap between the belts 20 and the lip portion 32 of wall 30. Blanks from the accumulated stack are then fed serially through the slot and into the nip of feed rolls 34, 36 for successive transfer to the stacking hopper 16. As each is fed, the light beam to sensor 40 is interrupted and the counter 124 is actuated to record the transfer of a blank.

When this feeding commences, the upper fingers are retracted and the midcount fingers 66 are in their extended positions as shown in FIG. 1 so that an auxiliary support is provided above the bottom of the stacking hopper 16 and the blanks 10 fed thereinto do not drop directly to the hopper bottom. In this manner tumbling or somersaulting of blanks into the hopper 16 with resulting misalignment of the blanks 10 is prevented as the distance the blanks fall is limited. This somersaulting tendency is a function at least in part of the size of the box blanks, and the provision of fingers 66 enable a greater range of acceptable box blank sizes to be accommodated by the apparatus. When the sensing system has counted a predetermined number of blanks, in the order of ten in a conventional box blank forming operation, contacts 124–1 close momentarily and energize solenoid 150 to actuate the pneumatic cylinders 68 and withdraw the midcount fingers 66 permitting the transferred blanks to drop as a group to the bottom of the hopper 16. The height of this number of blanks is selected so that a sufficient height is provided to prevent somersaulting of blanks subsequently fed into the hopper. Feeding from the storage hopper 14 is not interrupted during this transfer. When the sensing system indicates a second predetermined count, a typical value being thirty, contacts 124-2 and 124-3 close momentarily to again energize solenoid 150 (as a precaution) and to energize relay coil 142. With the energizing of coil 142, contacts 142-1 close, energizing solenoid 140 to raise fingers 44 and interrupt the blank transfer. Thus an accurate count of blanks actually transferred to the stack in hopper 16 is made as the transfer drive is not interrupted, and the blanks counted are stacked. Coil 142 also closes contacts 142-2 after a short delay to insure transfer of the counted blanks to hopper 16 and these contacts energize relay coil 144. As indicated above, energization of coil 144 operates contactor 118 to start drive motor 100.

Coil 144 also opens contacts 144-1 to release solenoid 140 and permit blank transfers to recommence. At the same time solenoid 152 is energized and extends upper fingers 70 to the dotted line position shown in FIG. 1 so that an upper auxiliary support is provided, clear of the pusher 82. Thus, transfer of blanks to hopper 16 is reinitiated at the same time that ejection of the stack from that hopper is initiated, with the upper auxiliary support insuring that the two groups of blanks are kept separate.

With the energization of motor 100 the vertical pusher 82 moves forward at a right angle to the direction of article transfer and pushes the stack of blanks 10 in the stacking hopper 16 out onto the conveyor 18 for transfer to a desired location. As the stack of blanks move forward, they contact the squaring roll 88 which forces them into alignment against the pusher and then as the pusher overcomes the biasing force, pivots to act against the edges of the blanks and align them in the second dimension. As soon as the ejector pusher has reached the end of the stacking hopper, limit switch 104 is actuated which closes contacts 104-1 to energize solenoids 148 and 154; and opens contacts 104-2 to release the holding circuit and de-energize coil 142. Solenoid 148 causes the midcount fingers 66 to extend and solenoid 154 retracts the upper fingers 70 dropping the blanks to the second auxiliary support without interrupting the transfer operation. The pusher 82 then returns to the starting position along the lower run of chains 84 and 86 and contacts limit switch 102 which opens contacts 102-1 and de-energizes the drive motor 100 and releases a spring loaded brake to lock the pusher 82 in position ready for the next feeding operation. As soon as the midcount value is again reached, contacts 124-1 close to energize solenoid 150 and transfer the partial stack of blanks to the hopper base by withdrawing fingers 66. (In certain machine cycles, it may be preferable to transfer the blanks when the pusher 82 has reset—as for example, through the use of momentarily closed limit switch contacts.)

Thus the apparatus permits controlled transfer and stacking of sheet material. Two storage sections may be employed, one of which provides temporary storage enabling an accurate count to be obtained independently of the nature of the feed to that section, and the other of which stacks the material and transfers stacks of accurately counted articles. In the stacking section there is provided two auxiliary support mechanisms which operate in conjunction with the feed from the storage section to control the entry of sheet articles into the stacking section rapidly and with minimal interruption, and without somersaulting or other similar misalignment problems. As the material is transferred between the two sections, it is serially counted, and at a first predetermined count an auxiliary support is removed permitting the accumulated stack of material to enter the main stacking section without interrupting the feed thereinto. At a second predetermined count, the feeding is temporarily halted in a manner to insure an accurate count and then recommenced employing a second auxiliary support structure. At the same time a transfer of the stacked material is initiated and the stacked blanks are transferred therefrom as a unit from the stacking section for further processing. As soon as the stack is out of the hopper, the next articles to be stacked are transferred from the second to the first auxiliary support, without interrupting feed, and the stack transfer mechanism is reset. The coordinated count control provides the correct number of components in each group even though the transfer and stacking operation may have been stopped in the middle of the group. The apparatus enables flexible association with either equipment, for example, transfer in either of two directions from the stacking section.

While a preferred embodiment of the invention has been shown and described, various modifications thereof will be obvious to those skilled in the art, and therefore it is not intended that the invention be limited to the disclosed embodiment or to details thereof and departures may be made therefrom within the spirit and scope of the invention as defined in the claim.

What is claimed is:

Stacking apparatus for handling sheet-like articles comprising a hopper, feed means for transferring articles to said hopper serially for assembly in a stack, ejection means including first and second endless drive elements disposed below said hopper and offset from one another in vertical and horizontal directions, each said drive element having an upper run and a lower run, a vertical disposed pusher element secured between said drive elements at similar run positions so that operation of said drive elements moves said pusher element through said hopper along a first path at one level and returns said pusher element to its starting point along a second path at a lower level, and means to operate said drive elements to advance said pusher element through said hopper to transfer an entire stack of articles from said hopper, first and second auxiliary support structures movable into and out of said hopper for providing auxiliary support for articles being fed into said hopper, said first auxiliary support structure being disposable in spaced relation to the base of the hopper so that the movement of said ejection means in said hopper does not interfere with said first auxiliary support structure and said second auxiliary support structure being disposable at a point between said first auxiliary support structure and the base of said hopper, and means to control the positions of said first and second auxiliary support structures.

References Cited by the Examiner
UNITED STATES PATENTS

| | | | |
|---|---|---|---|
| 2,761,361 | 9/1956 | Hornberger et al. | 93—93.3 |
| 2,854,900 | 10/1958 | Kleineberg et al. | 93—93.3 |
| 2,995,361 | 8/1961 | Lopez. | |
| 3,006,258 | 10/1961 | Jochem | 93—93.3 |

BERNARD STICKNEY, *Primary Examiner.*